Nov. 22, 1966  P. G. KOMPIER  3,287,548
HIGHWAY SAFETY LIGHT FOR AUTOMOTIVE VEHICLES
Filed July 9, 1964  2 Sheets-Sheet 1
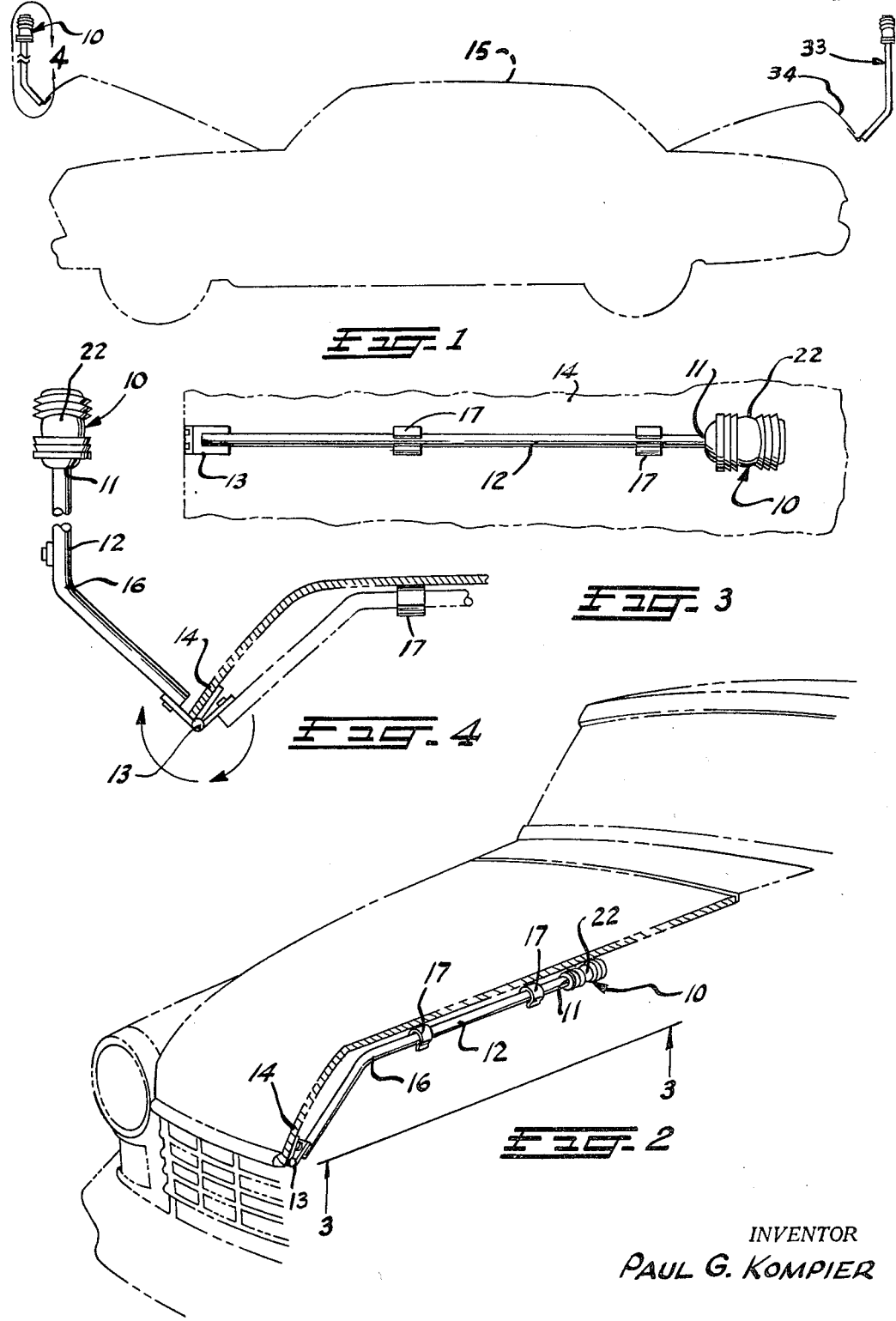
INVENTOR
PAUL G. KOMPIER Nov. 22, 1966  P. G. KOMPIER  3,287,548
HIGHWAY SAFETY LIGHT FOR AUTOMOTIVE VEHICLES
Filed July 9, 1964  2 Sheets-Sheet 2
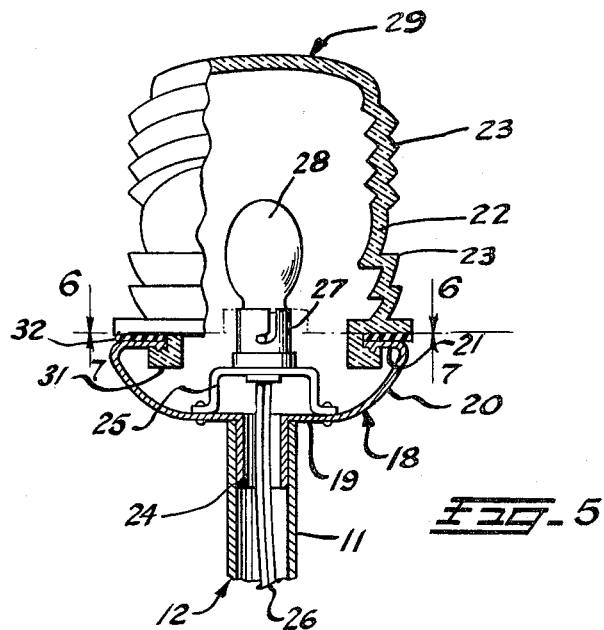
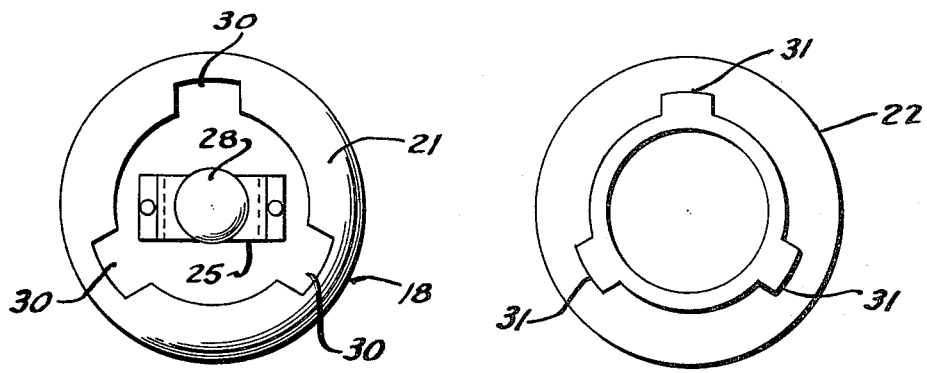
INVENTOR
PAUL G. KOMPIER United States Patent Office 3,287,548
Patented Nov. 22, 1966

3,287,548
HIGHWAY SAFETY LIGHT FOR AUTOMOTIVE
VEHICLES
Paul G. Kompier, 1551 Ohio Ave., Whiting, Ind.
Filed July 9, 1964, Ser. No. 381,360
1 Claim. (Cl. 240—7.1)

This invention relates to automotive vehicles and, more particularly, to a light that is used on the highway when the car has stopped for reasons of motor or tire troubles.

Many an accident has been caused (some of them fatal) when an automobile has had to stop on the highway at night because of some failure of its engine or when a tire has gone flat, and the vehicle was not seen in time to be avoided by other cars. This type of accident is particularly true of passenger cars that are not normally equipped with emergency flares, and most motorists unfortunately do not carry lanterns or flashlights.

It is, therefore, the primary purpose of this invention to provide automotive vehicles with a pair of highway safety lights that can be elevated when the lid of the engine compartment also known as the hood or the lid of the trunk of the car is opened in case of breakdown, thereby warning fellow motorists of the presence of the stopped vehicle.

Another purpose of this invention is to provide a highway safety light for automotive vehicles that is out of sight when the hood of the car and the lid of the trunk is closed.

Another purpose of this invention is to provide a highway safety light for automotive vehicles that can be attached to any existing vehicles, as well as being made standard equipment on all new cars.

Another purpose of this invention is to provide a highway safety light for automotive vehicles that does not have to be connected to the electric system of the vehicle or secured to any part of the car when needed, since this has already been done when the device was originally installed on the automobile.

Another purpose of this invention is to provide a highway safety light for automotive vehicles that automatically comes into use merely by pulling outward on its supporting tube when the hood or lid is lifted.

Another object of this invention is to provide a highway safety light for automotive vehicles that is constructed from readily obtainable parts now in stock in nearly every automobile accessory or electrical supply store.

Still another object of this invention is to provide a highway safety light for automotive vehicles that can be retailed in package form for installation by any mechanically-minded car owner.

Other objects and advantages will become apparent from the following detailed description, claim and drawings in which:

FIGURE 1 is an outline of the side of a typical passenger automobile, with its hood and trunk lid open, with this invention shown in position in solid black lines.

FIGURE 2 is a perspective view of the front of a typical passenger automobile with its hood cut open longitudinally, and this invention installed on the underside thereof.

FIGURE 3 is a view of this invention taken along line 3—3 of FIGURE 2 and viewed in the direction indicated by the arrows.

FIGURE 4 is an enlarged side view of this invention as indicated by the arrowed ellipse and the numeral 4 on FIGURE 1 of the drawing.

FIGURE 5 is a side view of the light portion of this invention, broken open to show its internal construction.

FIGURE 6 is a sectional view of this invention taken along line 6—6 of FIGURE 5 and viewed in the direction indicated by the arrows.

FIGURE 7 is a sectional view of this invention taken along line 7—7 of FIGURE 5 and viewed in the direction indicated by the arrows.

Referring to the first four figures of the drawings, it is seen that the reference number 10 indicates a transparent electric light secured to one end 11 of the light supporting tube 12 that has its other end secured to one end of a spring hinge 13, that has its other end secured to the underside of the hood 14 of an automotive vehicle that is shown in phantom lines in the appended drawings, and indicated by the reference number 15. It is of course understood that the aforesaid flat hinge 13 permits the hood 14 to be closed and locked with the light 10 in its elevated position. The same condition will apply should the light be mounted on the lid of the trunk of the vehicle as will later on be described in this specification. The aforesaid light supporting tube 12 is usually bent at 16 in order that it may be mounted as near the outer edge of the hood 14 as possible and still lie flat up against the underside of the hood to which it is held, when not in use, by a pair of spaced U-shaped clips 17, as clearly shown in FIGURES 2 and 3 of the drawings.

The transparent electric light 10 is shown in considerable detail in FIGURE 5. It is seen from a study of this aforesaid FIGURE 5 that this transparent electric light embodies a round supporting base 18, having a flat bottom 19 and upwardly curved sides 20, that terminate in a horizontally disposed flange 21 on which is mounted the transparent lens 22 that is basically tubular in shape and which has its sides formed in large corrugations 23 on each end. The aforesaid round supporting base 18 has an integrally and downwardly protruding hollow cylindrical member 24 in the center thereof, that is fitted into the aforesaid end 11 of the light supporting tube 12. An inverted U-shaped bracket 25 is mounted on the inside of the aforesaid round supporting base 18. The center of this just mentioned inverted U-shaped bracket 25 is over the center of the hollow cylindrical member 12, in order that the electric wires 26 may extend downward from the light socket 27 that is mounted on top of the aforesaid inverted U-shaped bracket 25 through the light supporting tube 12 to the electric system of the automotive vehicle 15 to which this invention is hingedly secured. The electric light bulb is indicated in the appended drawings by the reference number 28. The horizontally disposed flange 21 has slots 31 shown in FIGURE 7, to receive projections 31 of the lens 22, shown in FIGURES 5 and 7, for use in securing the lens to base 18. A gasket 32 is placed between flange 21 and lens 22, while 29 designates the top part of the lens.

This entire invention is indicated by the reference number 33 when it is mounted on the lid 34 of the trunk of the automotive vehicle 15, as shown in FIGURE 1 of the appended drawings.

It is to be understood that this invention is so connected to the electric system of the automotive vehicle to which it is secured that the light will automatically go on when the light supporting tube is removed from the pair of spaced U-shaped clips 17 and that the light will automatically be shut off when it is returned to the clips. It is also understood that an automobile may have two of these lights, one under the hood and one 30 under the rear trunk lid of the car. The invention is obviously mounted with its spring hinge 13 at the outward edge of the hood or lid of the car in order that the light may swing upward in the position shown in the already mentioned FIGURE 1 of the appended drawings.

While, in disclosing the principles of the invention and its preferred embodiment, various detailed structures and relationships have been disclosed; it will be understood that such embodiments and details are given by way of example only and not as limiting the scope of the invention. Other modifications can and may be employed within the scope of this invention.

Having thus described the invention, what is claimed is:

A highway safety light for automotive vehicles, comprising a transparent electric light secured to one end of a light supporting tube that has its other end hingedly secured by a spring hinge to the underside of the edge of the hood of an automotive vehicle by means of a flat spring hinge in such a manner as to permit the said transparent light to extend vertically upward, above the top of the said automotive vehicle, when the said hood is in an open position, and the said electric light being connected to the electric system of the said automotive vehicle, and a pair of spaced U-shaped clips secured to the underside of the said hood, the said clips being adapted to hold the said light supporting tube when the said hood is closed.

References Cited by the Examiner

UNITED STATES PATENTS

| | | | |
|---|---|---|---|
| 1,858,232 | 5/1932 | Piombo | 240—7.1 |
| 1,933,337 | 10/1933 | Piombo | 240—7.1 |
| 2,252,395 | 8/1941 | Cohen. | |
| 2,596,256 | 5/1952 | Laubaugh | 240—57 X |
| 2,736,005 | 2/1956 | Craddock | 240—7.1 X |
| 2,871,342 | 1/1959 | Mappes | 240—106.1 X |
| 3,175,186 | 3/1965 | Barenyi | 240—8.18 X |
| 3,177,358 | 4/1965 | Suttie | 240—53 X |

FOREIGN PATENTS 394,468    4/1924    Durio.

NORTON ANSHER, *Primary Examiner.*

J. F. PETERS, *Assistant Examiner.*